Dec. 3, 1963  J. DI PASQUA  3,112,814
SPRING MOTOR FOR SWINGS
Filed March 12, 1962  3 Sheets-Sheet 1

INVENTOR.
JOSEPH DI PASQUA
BY
Robert A. Slowan
ATTORNEY

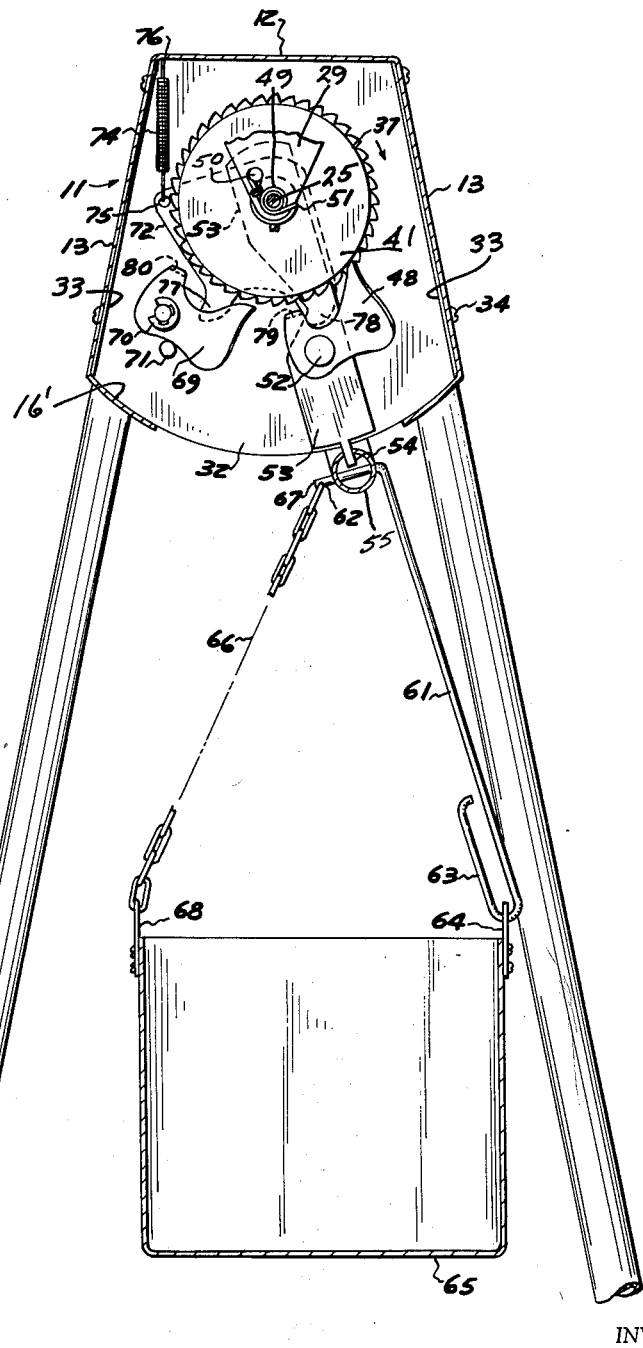
Fig. 2

Dec. 3, 1963  J. DI PASQUA  3,112,814
SPRING MOTOR FOR SWINGS
Filed March 12, 1962  3 Sheets-Sheet 3

INVENTOR.
JOSEPH DI PASQUA
BY
*Robert A. Sloman*
ATTORNEY

United States Patent Office 3,112,814
Patented Dec. 3, 1963

3,112,814
SPRING MOTOR FOR SWINGS
Joseph Di Pasqua, Detroit, Mich., assignor to Mechanical Swinging Cradle Company, Detroit, Mich., a corporation of Michigan
Filed Mar. 12, 1962, Ser. No. 180,070
5 Claims. (Cl. 185—37)

This invention relates to a spring motor adapted to actuate a suspended object for a pendulum-like movement, and more particularly to a spring motor adapted to operate a swing for a cradle.

It is the object of the present invention to provide a novel spring assembly for operating the spring motor.

It is another object of the present invention to provide a novel escapement ratchet wheel in conjunction with the spring motor assembly by which said motor is adapted to intermittently unwind transmitting stored energy from the spring therein to the movable member of the swing for effecting a pendulum-like movement.

It is another object of the present invention to provide a friction brake for use in conjunction with a spring winding shaft by which the said shaft is free to wind in one direction, but is frictionally retained against unwinding movement.

It is another object of the present invention to provide a novel, manually or power-operated rotated shaft which is axially threaded into the support shaft for winding the spring and which is adapted on rotation in one direction to effect said winding action.

These and other objects will be seen from the following specification and claims in conjunction with the appended drawings in which:

FIG. 2 is a fragmentary section taken on line 2—2 of FIG. 1.

It will be understood that the above drawings illustrate merely a preferred embodiment of the invention and that other embodiments are contemplated within the scope of the claims hereafter set forth.

The present spring motor assembly is associated with a swing or cradle and includes a support generally indicated at 11, FIG. 2, which is in the nature of a housing including top wall 12 and adjacent opposite edges thereof the depending downwardly and outwardly tapered walls 13, and the upright end walls 14. The said end walls include top flanges 15, which project under the top wall 12 and are suitably secured thereto.

Figure 1:
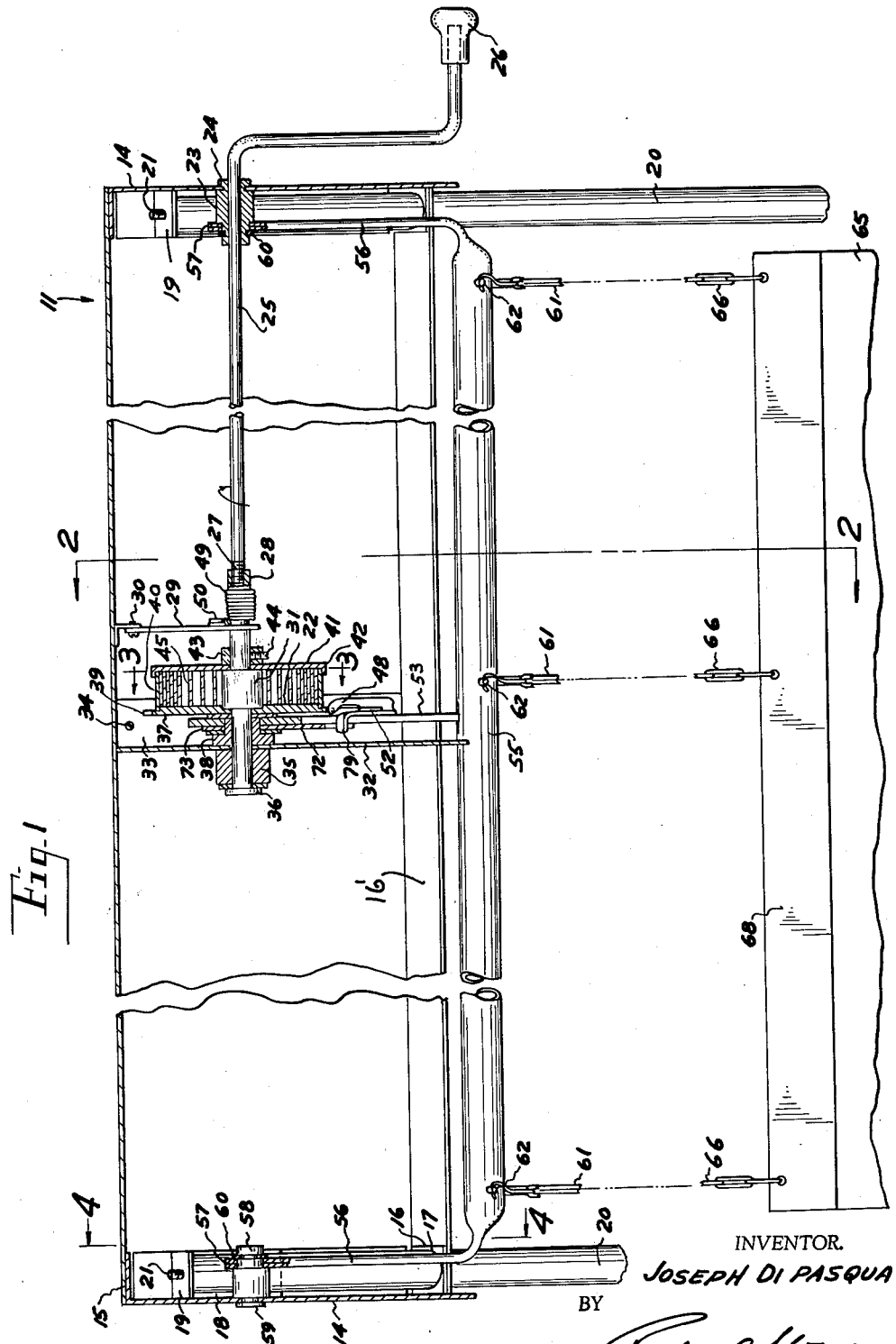
FIG. 1 is a fragmentary side elevational view of the present spring motor and associated swing fragmentarily shown, and partially broken away and sectioned for illustration.
Figure 4:
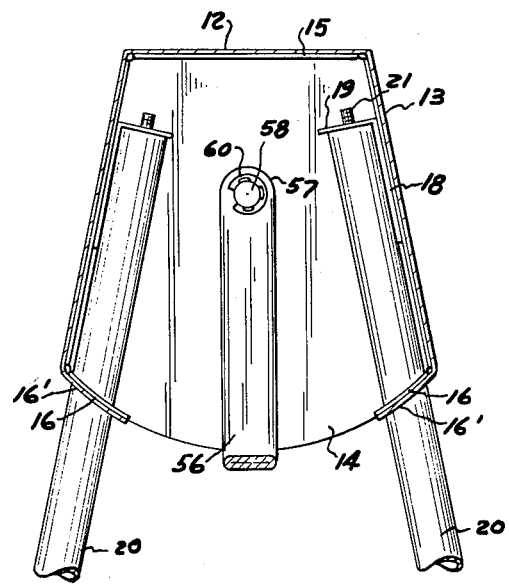
FIG. 4 is a fragmentary section taken on line 4—4 of FIG. 1.

The said end walls 14 also include at their lower opposite edges the inwardly directed flanges 16, which are apertured at 17, as shown in FIG. 1, and which cooperatively engage and are suitably secured to corresponding flanges 16', which extend downwardly and inwardly at the lower edges of the opposing front and rear walls 13, as shown in FIG. 4.

Like retaining brackets 18 are secured to interior surface portions of the front and rear walls 13 towards their upper ends, as is also shown in FIG. 4 and include the right angularly inwardly directed flanges 19 having threaded apertures to cooperatively receive the threaded studs 21 on the upper ends of the angular legs 20 which project up through the flanges 16' and 16 for retaining registry with flanges 19.

Opposed pairs of legs 20 are arranged adjacent opposite ends of the housing 11, with suitable rubber feet 20' at their lower ends for non-sliding cooperative engagement with the ground or floor surface.

Referring to FIG. 1, adjacent one end of the support or housing 11, and at a central portion of end wall 14 there is secured thereto as at 24 a suitable bronze bushing 23 which projects longitudinally of the said housing 11 and is adapted to cooperatively receive the rotative winding shaft 25, include handle 26, said shaft at its free end being threaded at 27.

Support plate 29 is secured to and depends from the top wall of the support 11, being secured thereto as at 30, FIG. 1. An additional upright support plate 32 is mounted within the support housing 11, parallel to plate 29, and includes a right angular flange 33 upon its opposite sides, which bears against the interior surfaces of the front and rear walls 13 of the said housing and are fixedly secured thereto as by the rivets or fasteners 34, which may be screws to thus provide a rigid mounting for the support plate 32, best illustrated in FIG. 2.

Horizontal shaft 28 is journaled and supported through the two plates 29 and 32. One end of the shaft 28 has an interiorly threaded bore adapted to cooperatively receive the threaded end 27 of winding shaft 25.

Shaft 28 intermediate its ends has an enlarged shoulder 31 for cooperative engagement with the end walls 22 and 41, which form part of a cylindrical housing for coil spring 45. The spacer bushing 35 receives one end of shaft 28 upon one side of support plate 32, as best shown in FIG. 1 and is retained with respect to said bushing by the enlarged head 36 and associated washer.

Axially mounted upon one side of the upright cylindrical spring housing there is provided an enlarged escapement ratchet wheel 37, which is suitably secured to the said housing as by welding. Bronze support bushing 38 is interposed between the other side of the upright wall 32 and the said ratchet wheel 37, there being a suitable spacer washer also interposed, as best shown in FIG. 1.

Figure 3:
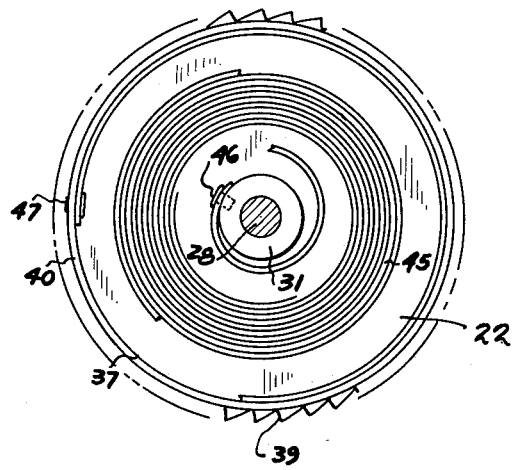
FIG. 3 is a fragmentary section taken on line 3—3 of FIG. 1, on an increased scale.

The ratchet teeth 39, as shown in FIG. 3, forming a part of the ratchet wheel 37 project beyond the periphery of the housing which includes the cupshaped body 22. The housing is completed by the cupshaped end wall 41, whose annular flange 42 extends around the base portion of the said cupshaped body 22 to form the cylindrical housing enclosure for the coiled spring 45, shown on an enlarged scale in FIG. 3.

The cupshaped housing includes an annular wall 40, shown in FIG. 3. The said coiled spring 45 which extends around the shoulder 31 of shaft 28 is anchored at one end as at 47 to the said outer wall 40 of a cylindrical spring housing. The said housing is loosely journaled centrally upon shaft 28 and is retained against endwise movement thereon by virtue of the shoulder 31, forming a part of the shaft, as well as by the locking collar 43 with set screw 44, also shown in FIG. 1.

It is believed that the primary purpose of the collar 43 is to retain the end wall 41 or cover with respect to the cupshaped body portion of the cylindrical housing 22—40, completing the assembly of the spring housing. The inner end of the coiled spring is anchored as at 46, FIG. 3, to the cylindrical enlargement 31, which forms an integral part of the horizontally disposed rotatable shaft 28.

A suitable friction brake means is mounted upon the support plate 29, FIG. 1, adapted to cooperatively receive the shaft 28 and operatively retain the same against unwinding rotation. For this construction there is provided a coiled spring 49, which at one end is anchored at 50 to support plate 29, the said coiled spring 49 extending around an end portion of shaft 28 loosely engaging the same for permitting relative rotation of shaft 28 with respect thereto in one direction, as for winding the coiled spring 45.

The coiled spring 49 is so constructed and arranged with respect to shaft 28 that upon a tendency of shaft 28 to rotate in the opposite direction, the coils of the spring 49 will tighten around the said shaft for retaining the said shaft against unwinding rotation in the opposite direction. This means that once the shaft 28 has been rotated through the action of the rotatable handle 25—26 placing a compression upon the coiled spring 45, the spring may not accidentally unwind due to the friction brake assembly shown at 49—50, FIG. 1 and 2. In this connection it is noted that the other free end 51 of the coiled spring 49 loosely engages shaft 28, as best shown in FIG. 2.

The upright bar 53 adjacent its upper end is journaled upon bushing 38 on shaft 28 for limited reciprocating swinging movement thereon. The bar 53 is arranged intermediate support plate 32 and the housing 22—40—41, best illustrated in FIG. 1. As hereafter described, the upright bar will receive intermittently released expansive energy from the coil spring 45 to effect the reciprocal swinging movements of the object shown in FIG. 1 and FIG. 2, which is in the form of a cradle in accordance with the present illustrative embodiment hereafter described in further detail.

A first pawl 48 is pivotally mounted at 52 upon a lower portion of upright bar 53, being arranged off-center with respect to the pawl construction so that said pawl normally has a tendency to gravitate in a clockwise direction when disengaged from the escapement ratchet wheel 37.

In FIG. 2 it is seen that with the coil spring 45 of FIG. 3, wound tightly, the escapement ratchet wheel 37 is retained against unwinding movement by virtue of the retaining engagement of pawl 48 with respect thereto.

The lower end of the upright bar 53 is secured at 54 to the transverse horizontally elongated support tube 55, whose respective right angular spaced flattened end portions 56 are journaled as at 57 upon the respective support bushings 23 and 58 shown in FIG. 1. Left hand support bushing 58 is anchored to the adjacent end wall 14 as at 59. Both of the said support bushings 58 and 23 are axially aligned with shaft 28 which provides the primary support for the spring motor above described. The end portions of members 56 are retained upon the respective bushings by suitable locking rings 60, for illustration.

In the illustrative embodiment of the present invention there is shown a cradle or swing, FIG. 2, which is adapted for a swinging pendulum-like movement as suspended from the support tube 55. A series of substantially upright longitudinally spaced rods 61 include at their upper ends right angular extensions 62, which project through and are secured to tubular support 55. The lower ends of the supports 61 are looped at 63 to engage a series of support clips 64 projecting from the rear wall of the swing body or basket 65. A corresponding number of chains 66 are secured at their upper ends as at 67 to the forward end portions of the respective extensions 62 of rods 61.

The lower ends of the said chains are anchored as at 68 to corresponding longitudinally spaced brackets connected with the upright front wall of the swing or basket 65 to complete the swing assembly which is longitudinally spaced between the respective end pairs of legs 20 of the present swing structure. In the present preferred embodiment of the invention there is thus provided a mechanically swingable cradle under the operation of the present swing motor.

The pawl 69 is pivotally mounted in off-center position as at 70 upon the upright support plate 32 and includes a forwardly extending detent portion which is adapted for operative retaining engagement with respect to the teeth 39 of the escape ratchet wheel 37. It is noted, however, in FIG. 2 that when the said pawl 69 is out of engagement with the said ratchet wheel, it will drop by gravity to the position shown in FIG. 2 so as to engage the stop pin 71. Accordingly each of the respective spaced pawls 48 and 69 are adapted to be alternately tipped by gravity out of engagement with the ratchet wheel 37.

The control for the intermittent engagement and disengagement of the respective pawls 48 and 69 with respect to the said ratchet wheel is effected by the employment of the present rocker plate 72 which, as shown in FIG. 1, is rotatively journaled for a limited reciprocal swinging movement upon the bushing 38 on shaft 28.

The said rocker plate 72 is interposed between support plate 32 and the upright bar 53, as indicated at 73. Coil spring 74 at one end at 76 is anchored to support housing 12 and at its opposite end at 75 is secured to the rocker plate 72 normally biasing said rocker plate in a clockwise direction with respect to the shaft 28. The said rocker plate 72 has a pair of spaced radially extending dogs 77 and 78. The dog 77 upon rotation of rocker plate 72 in a clockwise direction is adapted to operatively engage the inturned flange 80 on pawl 69 for pivoting the said pawl from the disengaged position shown in FIG. 2 to an engaged position, so that its detent portion retainingly engages the ratchet wheel 37. By the same token, when the rocker plate 72 is rotated in the opposite direction against the action of spring 74, it is seen that the pawl 69 becomes disengaged and will drop by gravity to the disengaged position shown in FIG. 2.

The second pawl 48 also includes an inwardly directed flange 79 which is adapted to intermittently and operatively engage the dog 78 on the rocker plate 72 for the purpose of rotating the said rocker plate in a counterclockwise direction against the action of coil spring 74. This action will occur when the bar 53 is swinging from a substantially upright central position in a counterclockwise direction, such as to the position shown in FIG. 2.

Here the bar 53 carries the pawl 48, which is pivotally mounted thereon at 52 and the flange 79 on said pawl operatively engages the dog 78. This causes the pawl 48 to pivot about its support 52 in a counterclockwise direction into operative retaining engagement with the ratchet wheel 37. Accordingly, it is seen that the pawl 48 and its detent portion engaging the said ratchet wheel restrains the ratchet wheel against unlimited rotary unwinding movement. On the other hand, however, the expansive forces transmitted to the escapement ratchet wheel 37 by virtue of the coiled spring 45 have a tendency to rotate the ratchet wheel 37 in the clockwise direction shown in FIG. 2. This force is transmitted through the pawl 48 to the swing shaft or bar 53, causing the said bar to begin its pendulum-like swing in a clockwise direction from the position shown in FIG. 2.

In operation it is seen that as the bar 53 reaches a substantially upright position, the associated pawl 48 and its flange 79 begins to release the dog 78 on the rocker plate 72. There is a follow up action because the spring 74 is constantly urging the rocker plate 72 in a clockwise direction. By the time the dog 77 under the action of spring 74 has moved to a position so as to operatively engage the flange 80 on pawl 69, it will cause the said pawl 69 to rotate about its support 70 in a counterclockwise direction so that the said pawl 69 operatively and retainingly engages the ratchet wheel 37.

At the same time the pawl 48 has become disengaged from the dog 78, and at the same time from the ratchet wheel 37, and will rotate by gravity to a disengaged position about its pivotal point 52.

Since the bar 53 has a certain amount of momentum, and since the ratchet 37 is retained against further unwinding movement due to the re-engagement of the pawl 69 therewith, the bar 53 will begin its return pendulum-like movement from an extreme lefthand position towards the position shown in FIG. 2. In this connection, it is seen that again the flange 79 on pawl 48 begins to operatively engage the dog 78 of the rocker plate 72, causing the said rocker plate to rotate in a counterclockwise direction against the action of spring 74. By the time the bar 53 has reached the position shown in FIG. 2, the rocker plate 72 has been moved to the position shown in FIG. 2 disengaging the pawl 69 which drops by gravity to the position shown. At the same time the dog 78 in operative engagement with the flange 79 has caused the pawl 48 to tilt to the retaining position shown in FIG. 2 to thus again be in a position to respond to the unwinding action of the coiled spring 45 acting through escapement ratchet wheel 37.

By this construction thus it is seen that there is a pendulum-like movement transmitted to the bar 53 which in turn is transmitted to the tubular support 55, which mounts the basket or swinging cradle 65, as above described.

Having described my invention, reference should now be had to the following claims.

I claim:

1. In a spring motor adapted to actuate a suspended object for a pendulum-like movement, a support, a pair of upright support plates on said support, a horizontal shaft journaled through said plates adapted for spring winding rotation in one direction, a friction brake means upon one support plate receiving and operatively retaining said shaft against unwinding rotation in the opposite direction, a housing axially journaled upon said shaft, a coiled leaf spring within the housing extending around the shaft, at one end anchored to said shaft and at its other end secured to said housing, an escapement ratchet wheel axially mounted and secured to said housing, an upright bar journaled upon said shaft for limited reciprocating swinging movement thereon, a pawl pivotally mounted upon one of said support plates for intermittent retaining engagement with said ratchet wheel, a second pawl pivotally mounted upon a lower portion of said bar for intermittent alternate engagement with said ratchet wheel, each pawl adapted to be alternately tipped out of engagement with the ratchet wheel, a rocker plate mounted upon the shaft for limited reciprocating swinging movement and including a pair of spaced dogs, each pawl having a projecting flange adapted to be brought into alternate engagement with one of said dogs, effecting alternate engagement of said pawls respectively with said ratchet wheel, and spring means anchored upon said support biasing said rocker plate in one direction upon said shaft, the pawl on said bar adapted to alternately rotate said rocker plate in the opposite direction against said spring bias.

2. In a spring motor adapted to actuate a suspended object for a pendulum-like movement, a support, a pair of upright support plates on said support, a horizontal shaft journaled through said plates adapted for spring winding rotation in one direction, a friction brake means upon one support plate axially receiving and operatively retaining said shaft against unwinding rotation in the opposite direction, a housing axially journaled upon said shaft, a coiled leaf spring within the housing extending around the shaft, at one end anchored to said shaft and at its other end secured to said housing, an escapement ratchet wheel axially mounted and secured to said housing, an upright bar journaled upon said shaft for limited reciprocating swinging movement thereon, a pawl pivotally mounted upon one of said support plates for intermittent retaining engagement with said ratchet wheel, a second pawl pivotally mounted upon a lower portion of said bar for intermittent alternate engagement with said ratchet wheel, each pawl adapted to be alternately tipped out of engagement with the ratchet wheel, a rocker plate mounted upon the shaft for limited reciprocating swinging movement and including a pair of spaced dogs, each pawl having a projecting flange adapted to be brought into alternate engagement with one of said dogs, effecting alternate engagement of said pawls respectively with said ratchet wheel, and spring means anchored upon said support biasing said rocker plate in one direction upon said shaft, the pawl on said bar adapted to alternately rotate said rocker plate in the opposite direction against said spring bias, on swinging movement in one direction of said bar, to disengage the pawl on said support and engage the pawl on said bar with said ratchet wheel, rotation in the opposite direction of said bar being under the expansive unwinding action of said spring acting through said ratchet and the pawl on said bar, continued movement in the same direction disengaging the pawl on said bar from said rocker plate and from the ratchet wheel, said rocker plate under its spring bias moving to operatively engage the pawl on said support, moving said pawl into operative retaining engagement with said ratchet wheel.

3. In the spring motor of claim 1, said friction brake means including a coiled spring at one end anchored to said support plate and snugly coiled around said shaft, winding action of said shaft tending to loosen the coiled spring, whereas unwinding action tending to tighten said spring relative to said shaft.

4. In the spring motor of claim 1, said shaft at one end having an interiorly threaded bore, and an elongated manually rotatable shaft adjacent one end journaled through said support, and at its free end threaded into said horizontal shaft for driving engagement therewith in one direction.

5. In the spring motor of claim 1, said cylindrical housing having opposed upright end walls, said horizontal shaft intermediate its ends having an enlarged shoulder cooperatively nested within the spring housing engaging said end walls retaining the housing against endwise movement, the opposite edges of said spring being in loose cooperative engagement with said end walls.

References Cited in the file of this patent

UNITED STATES PATENTS

| | | |
|---|---|---|
| 579,256 | Bukolt | Mar. 23, 1897 |
| 630,894 | Josefkowicz | Aug. 15, 1899 |
| 2,461,784 | Streed | Feb. 15, 1949 |
| 2,979,734 | Saint | Apr. 18, 1961 |
| 3,073,416 | Di Pasqua | Jan. 15, 1963 |